Patented Oct. 9, 1945

2,386,374

UNITED STATES PATENT OFFICE 2,386,374

FERMENTATION PROCESSES

Charles Weizmann, London W. C. 1, England

No Drawing. Application March 2, 1942, Serial No. 432,999½. In Great Britain April 23, 1941

4 Claims. (Cl. 195—42)

This invention relates to fermentation processes particularly those for the production of solvents often termed neutral solvents and for the production of aliphatic acids.

The object of the invention is to provide new or modified processes for the production of such solvents and acids. As regards solvents important products are acetone and butyl alcohol. As regards aliphatic acids important members of this group are butyric, propionic, acetic and lactic acid.

Fermentation processes so far for the production of acetone, butyl alcohol and volatile aliphatic acids (butyric, propionic and acetic acid) have been characterized by the fact that the fermentation products consisted mainly either of neutral solvents or of volatile aliphatic acids.

I have now found that by the application of what appears to be a new or hitherto unisolated or unapplied bacterium capable of fermenting a great variety of starch or sugar containing materials, I am able to produce in some instances simultaneously neutral solvents and aliphatic acids in quantities of about the same order of magnitude. This is a matter of particular importance in cases where the primary fermentation products are to be converted into other substances and where transformation products of both the neutral solvents and the aliphatic acids are required. The new bacterium, as explained in more detail below, has a tendency towards acid production. In the case, therefore, of the fermentation of such materials as give appreciable amounts of aliphatic acids on treatment even with acetone-butanol producers such as *Clostridium acetobutylicum*, the new bacterium proves a still more powerful acid producer. Pentosans and the sugars obtained by treatment of straw and similar materials with dilute acids are examples of bodies which show the aforesaid tendency towards acid formation in fermentation.

Characteristics of the new bacterium

For the new bacterium I employ the name *Clostridium butylo-butyricum*, in order to indicate that butyl alcohol and butyric acid (together with acetone, acetic acid, propionic acid, hydrogen and carbon dioxide) are the final metabolic products.

With materials in which *Clostridium acetobutylicum* forms neutral solvents practically exclusively, the new organism forms a mixture of neutral and acidic products. On other materials, on which even *Clostridium acetobutylicum* gives considerable amounts of acids, e. g. straw hydrolysate and wheat-bran, the relative amount of acids produced by the new organism is still higher as above stated.

The new organism shows the important property that it attacks high-molecular carbohydrates of the cellulosic and hemicellulosic type, provided that a certain amount easily fermentable carbohydrate of the starch or glucose type is available. It appears that the fermentation enzymes of the bacterium, in fermenting easily available carbohydrates, become capable of extending their activities to high-molecular carbohydrates of the cellulosic type which by themselves are not attacked. In rice-bran, e. g. not only the starch is fermented by the new micro-organism, but also the pentosan and part of the cellulosic matter present. The yield in fermentation products is considerably higher than that expected from the starch content alone; an average of 35% of the weight of the starch is expected theoretically in form of fermentation products; actually up to 60% are obtained. The same is true for other raw materials which contain, besides sugar or starch or both also, carbohydrates of the cellulosic and the hemicellulosic type.

This effect becomes still more marked when these latter carbohydrates had been subjected to a treatment which degrades them slightly, without reaching the stage of reducing sugars or monosaccharides.

A by-product and possibly an intermediate product in the formation of the above-named substances is lactic acid.

The fermentative power of the aforesaid organism is not limited to starchy materials; low-molecular sugars are fermented and even an aqueous dextrose solution proves a good substrate, if nitrogeneous materials and the necessary activators are provided; both are supplied by a yeast extract.

The new bacterium is chromogenic; it produces an orange-red color. This color is very characteristic for the bacterium; its disappearance is an indication of the formation of the white variant which is dealt with below.

*Clostridium butylo-butyricum* is a spore-former; it can, therefore, withstand heating to a temperature of 100° C., at least for short periods. It must, however, be noted that the accumulation of free acids, which is a result of the fermentation process, destroys the spore-forming power of the organism. It has proved beneficial for large-scale fermentations to activate the bacterium by "shocking," i. e. by heating the spore-culture for two minutes to 100° C. before inoculation. It must, however, be observed that this treatment is applicable only to spores and should not be applied to cultures less than four days old.

The name "*butylo-butyricum*" does not imply that butyric acid is the only volatile acid formed in fermentations caused by this micro-organism. The acids observed are butyric and acetic acid, with usually minor quantities of propionic acid;

in cases where the fermentation is slow more propionic acid is formed. The ratio also depends on the temperature at which the fermentation is carried into effect. As with other micro-organisms, an increase of the temperature from the generally used 37° C. to 42° C. makes the formation of propionic acid predominant.

*Clostridium butylo-butyricum* is not only capable of degrading starch to "fermentable" sugar; it possesses also a high proteolytic power: the proteins of the starting materials for the fermentation are solubilized and to an appreciable extent even degraded to the stage of amino-acids.

The following figures are significant in this respect:

In the fermentation of

Maize (protein content 10.0) 26.8% of the protein are solubilized and 21.1% of this quantity in form of amino-acids.

Rice-bran (protein content 9.7) 19.1% of the protein are solubilized and 44.9% of this quantity in form of amino-acids.

Wheat-bran (protein content 15.4) 46.4% of the protein are solubilized and 23.3% of this quantity in form of amino-acids.

*Isolation of the bacterium*

The bacterium according to the preceding section has been isolated from an East-African hibiscus species, *Hibiscus sabdariffa* (Rozella) L., and grows very well on mashes made up from maize, potatoes, rice-bran and the like, on which it causes an active fermentation. When the bacterium, isolated from its natural habitat, has been strengthened by repeated passage through such media, as indicated above, a final purification can be achieved by plating-out under anaerobic conditions and isolating single, well-defined colonies, which can then be propagated in the usual manner. Potato extract-agar or maize agar have been found the most satisfactory media for this purpose. The colonies so obtained were intensely pigmented and circular, had a diameter of 2–4 mm. and were either flat or had a depressed center. This center was always red and surrounded first by an orange and then a white zone; around the colonies the medium had become transparent due to diastatic hydrolysis of the starch.

As the accumulation of free acids destroys the bodies of the bacteria and spores, the propagation of the organism must be carried into effect on mashes containing a quantity of a neutralizing agent, preferably calcium carbonate, sufficient to neutralize the acids to be expected from the fermentation of this mash. In the fermentative practice, this addition is not always necessary, as the buffering power of the nitrogeneous materials present in most natural raw materials is high enough to prevent too early a stoppage of the fermentation by the accumulated acids. As a matter of fact, by adding calcium carbonate to or omitting it from the mash, the ratio of neutral solvents and aliphatic acids in the final fermentation product can be varied to a certain extent, an observation which gives the technical application of the new bacterium a certain flexibility.

Under unfavorable conditions, viz. if the accumulation of acid is not carefully checked, the bacterium degenerates into a white variant. Its properties can be learned from the following data.

A potato-mash culture of the red strain, vigorously fermenting, was inoculated into maize mash, but no calcium carbonate was added. The fermentation was lively, but after 48 hours the pink color had disappeared. After 24 more hours, sub-cultures were made into maize mash and this procedure repeated twice, leaving each time a period of 3 days between two inoculations. In each generation, the fermentative power decreased, and so did the color; eventually, the test tubes remained completely colorless, although the morphology of the organism was quite normal. Plating-out on potato mash-agar gave numerous, well-isolated colonies of a form identical with each other and with the red organism, but the colonies were colorless, and no zone of hydrolyzed starch was visible around them.

Inoculation of single colonies into maize mash gave no fermentation or growth; better results were obtained by inoculation into potato mash, where after 24 hours healthy organisms were observed; straight and slightly curved rods with rounded ends and often in chains. Some showed branching, others budding either at the end or the sides of the rods. Numerous involution forms and spores were observed, the latter being oval and usually equatorial, more seldom terminal.

Of the biochemical properties of the white variant, two features are outstanding: it does not attack starch—neither does it ferment it directly, nor has it any diastatic power—and it forms no neutral solvents at all, while with the red organism the production of neutral solvents is especially marked, when starting with low-molecular sugars. The fermentation of glucose by the white variant in presence of yeast is, however, vigorous, and the acidic products are the same as with the red form.

The invention embraces a fermentation process for the production both of neutral solvents and of aliphatic acids in accordance with which *Glostridium butylo-butyricum* as defined above is caused to ferment starch or sugar as above indicated.

The invention also embraces a process in accordance with the preceding paragraph applied to the fermentation of cellulosic and hemicellulosic materials in presence of a comparatively easily fermentable carbohydrate, namely, starch or sugar.

The invention also includes processes as herein described including means of isolating, propagating and applying *Clostridium butylo-butyricum*.

*Examples*

The following examples illustrate how the invention may be carried into effect:

(1) *Fermentation of maize in presence of calcium carbonate.*—A mixture of 100 parts maize meal and 2000 parts of water was sterilized at 120° for 2 hours and, after addition of 50 parts sterile calcium carbonate inoculated with a culture of *Clostridium butylo-butyricum*. The fermentation at 37° C. lasted 4 days; after this time substantially no starch was present and the solution contained 2.0 parts reducing sugar (calculated as glucose), which had not fermented. By distillation of a third of the resulting product, 13.0 parts neutral solvents were isolated—using the generally adopted methods; when the residue was acidified with dilute sulphuric acid and, after filtration from the calcium sulphate formed, distilled, a strongly acid distillate was obtained, which contained 24.4 parts acid (calculated as butyric acid). Analysis of the acidic product (by the method of Duclaux-Richmond) showed that it consisted of 50.5% butyric and 49.5% acetic acid. The total quantity of products amounts, therefore, to 61% by weight of the starch content (65%) of the maize meal in the original mash.

(2) *Fermentation of rice-bran in presence of calcium carbonate.*—450 parts rice-bran (analysis: 22.5% starch; 6.0% pentosans) were heated with 4000 parts of water for 2 hours at 120° and after addition of 80 parts sterile calcium carbonate then inoculated with a culture of the new organism. The fermentation at 37° C. lasted 5 days and exhausted the starch completely; practically no reducing sugar appeared to be present in the fermentation product. Its treatment in the manner described in the previous example, led to the following result: 23 parts neutral solvents and 66 parts acids (calculated as butyric acid) were formed. The acids consisted of 33.4% butyric, 7.9% propionic and 56.7% acetic acid; the total amount of fermentation products (89 parts) corresponds to 88% of the starch contained in the original mash (101.3 parts).

(3) *Fermentation of rice-bran.*—In the manner of Example 2, 50 parts of a rice-bran, containing 50% starch and 6% pentosans, were fermented, but without the addition of sterile calcium carbonate. When after 4 days the lively fermentation subsided, 4.5 parts of reducing sugar were found unfermented in solution, originating from the diastatic breakdown of the starch. The reaction products were: 1.5 parts neutral solvents and 6.0 parts acidic products (calculated as butyric acid), i. e. together 30.0% of the initial amount of starch. The acidic products consisted of 46.1% butyric, 12.8% propionic and 41.1% acetic acid.

(4) *Fermentation of wheat-bran in presence of calcium carbonate.*—100 parts wheat-bran (analysis: 20.0% starch; 9.9% pentosans), 30 parts sterile calcium carbonate and 900 parts water formed the initial mash, which was treated as in the previous examples. The fermentation at 37° C. was practically finished after 3 days, when the fermentation product contained apparently no starch and only 2.7 parts reducing sugars (calculated as glucose). The reaction products were: 1.0 part neutral solvents and 15.8 parts acids (calculated as butyric acid); the acids consisted of 40.3% butyric, 25.0% propionic and 34.7% acetic acid. The total of 16.8 parts fermentation product is equal to 84% of the starch, contained in the wheat-bran used.

(5) *Fermentation of molasses by method of "mass inoculation."*—100 parts rice-bran, and 900 parts water were, after sterilization and addition of 20 parts sterile calcium carbonate, inoculated with a rice-bran culture of the organism and incubated at 37° C. After 24 hours, the actively fermenting mash was poured into a mixture of 200 parts molasses (containing 100 parts sugar, calculated as glucose after hydrolysis) and 800 parts water, which had been previously sterilized in presence of 100 parts calcium carbonate for 2 hours at 120°. Four days after the addition to the molasses apparently no starch and only 4.2 parts sugar were left unfermented. The products isolated were 2.8 parts neutral solvents and 40.9 parts (calculated as butyric acid) acids, which were composed of 37.4% butyric, 21.0% propionic and 41.6% acetic acid.

(6) *Fermentation of wheat in presence of calcium carbonate.*—The initial mash consisted of 50 parts wheat (containing 62% starch and 5.6% pentosans), 50 parts sterile calcium carbonate and 950 parts water and was prepared in the manner described in preceding examples. The fermentation went to substantial completion in 5 days. 6.3 parts neutral solvents and 15.2 parts acids (calculated as butyric acid) were isolated, corresponding to 20.3 and 50.0%, respectively, of the starch employed in the mash. A Duclaux-Richmond analysis of the acidic product showed it to consist of 43.7% butyric, 2.7% propionic and 53.6% acetic acid.

(7) *Fermentation of hydrolyzed wood by method of "mass inoculation."*—50 parts rice-bran, 10 parts sterile calcium carbonate and 900 parts water were used as initiator; after 24 hours' inoculation at 37° C., the mash was added to a wood hydrolyzate, obtained in the following manner: 50 parts air-dry ash sawdust were heated for 3 hours at 140° C. with 450 parts of 0.5% sulphuric acid. The resulting mixture, which contained 10.2 parts reducing sugar (calculated as glucose) was neutralized with aqueous ammonia and after addition of 20 parts calcium carbonate sterilized for 2 hours at 120° C. The fermentation was now carried into effect at 43° C. From the time of the addition of the rice-bran mash, 6 days elapsed until evolution of gas had ceased. Apparently no reducing sugar was present in the fermented liquor, but in this case only acidic products (7.4 parts calculated as butyric acid) had been formed. The acids consisted practically exclusively (94%) of propionic acid, the remainder of 6% being acetic acid.

(8) *Fermentation of hydrolyzed straw.*—The procedure, described in the preceding example, was followed, using 50 parts of straw as starting material; the hydrolysis gave 14 parts reducing sugar (calculated as glucose). Again, the fermentation product after 6 days apparently contained neither sugar nor neutral solvents. The product consisted entirely of propionic acid, of which 8.5 parts were isolated in form of the calcium salt.

Although in these two cases the extent to which the carbohydrates are attacked is not as favorable as in other instances, these two cases indicate a method of obtaining propionic acid in pure form.

I claim:

1. In the fermentation of carbohydrates, starches, sugars, cellulosic and hemi-cellulosic materials, to produce useful organic material, the process which comprises inoculating a mash of such a material with a culture of *Clostridium butylo-butyricum* and allowing fermentation of said mash to take place at temperatures not substantially below 37° C. and not substantially above 43° C.

2. The process of claim 1 wherein the material which is fermented is an easily fermented carbohydrate of the class consisting of starch and sugar.

3. The process of claim 1 wherein a neutralizing agent is added to the mash to neutralize the acid products of fermentation; thereby suppressing the formation of non-acid products.

4. The process of claim 1 wherein calcium carbonate is added to the mash in quantity sufficient to neutralize the acid products of fermentation; thereby suppressing the formation of non-acid products.

CHARLES WEIZMANN.